(12) United States Patent
Wei et al.

(10) Patent No.: US 8,194,059 B2
(45) Date of Patent: Jun. 5, 2012

(54) PORTABLE MULTIMEDIA PLAYBACK APPARATUS

(75) Inventors: Ting-Hsun Wei, Tainan Hsien (TW); Chi-Chin Lien, Taipei (TW)

(73) Assignee: Mediatek Inc., Hsinchu (TW)

( * ) Notice: Subject to any disclaimer, the term of this patent is extended or adjusted under 35 U.S.C. 154(b) by 0 days.

(21) Appl. No.: 13/220,587

(22) Filed: Aug. 29, 2011

(65) Prior Publication Data
US 2011/0311208 A1  Dec. 22, 2011

Related U.S. Application Data

(62) Division of application No. 11/542,999, filed on Oct. 4, 2006, now Pat. No. 8,035,628.

(51) Int. Cl.
*G09G 5/00* (2006.01)
(52) U.S. Cl. ........................................ 345/204; 348/572
(58) Field of Classification Search ............ 345/87–102, 345/204, 690–699; 348/552, 572, 705, 441
See application file for complete search history.

(56) References Cited

U.S. PATENT DOCUMENTS

| | | | |
|---|---|---|---|
| 5,926,608 A | 7/1999 | Moon et al. | |
| 6,177,946 B1 | 1/2001 | Sinclair et al. | |
| 6,310,659 B1 | 10/2001 | Glen | |
| 6,909,411 B1 | 6/2005 | Yamazaki et al. | |
| 7,248,784 B1 | 7/2007 | Kori et al. | |
| 7,394,501 B2 | 7/2008 | Iwata | |
| 7,573,534 B2 | 8/2009 | Kwon | |
| 2004/0169751 A1 | 9/2004 | Takemura et al. | |
| 2004/0174466 A1 | 9/2004 | Kwon | |
| 2004/0186935 A1 | 9/2004 | Bell et al. | |
| 2006/0005134 A1 | 1/2006 | Iwata | |
| 2009/0051781 A1 | 2/2009 | Takemura et al. | |

FOREIGN PATENT DOCUMENTS

| | | |
|---|---|---|
| JP | 2000123480 A | 4/2000 |
| JP | 2002247520 A | 8/2002 |
| JP | 2004096466 A | 3/2004 |
| JP | 2004248061 A | 9/2004 |
| JP | 2006019810 A | 1/2006 |
| WO | 2006081732 A1 | 8/2006 |

OTHER PUBLICATIONS

Japanese Office Action mailed Oct. 6, 2009 for Japanese Patent Application No. 2007-065274.
Taiwan Office Action for Taiwan Patent Application No. 096102743 (Apr. 27, 2010).
Japan Office Action mailed Sep. 28, 2011.
English translation of abstract of JP 2004-096466.
English translation of abstract of JP 2002-247520.
English translation of abstract of JP 2000-123480.
English translation of abstract of JP 2006-019810.
English translation of abstract of JP 2004-248061.

*Primary Examiner* — Stephen Sherman
(74) *Attorney, Agent, or Firm* — Thomas, Kayden, Horstemeyer & Risley, LLP

(57) ABSTRACT

A portable multimedia playback apparatus is provided. The portable multimedia playback apparatus comprises a first video processing unit, a second video processing unit, a third video processing unit, a multiplexer, and a digital-to-analog converter (DAC). The first video processing unit generates a digital video signal. The second video processing unit processes the digital video signal to generate a TV compatible signal. The third video processing unit processes the digital video signal to generate a flat panel compatible signal. The multiplexer selects one of the TV compatible signal and the flat panel compatible signal. The DAC outputs an analog video signal after converting the selected signal.

7 Claims, 4 Drawing Sheets

PORTABLE MULTIMEDIA PLAYBACK APPARATUS

CROSS-REFERENCES TO RELATED APPLICATIONS

This application is a divisional application of U.S. patent application Ser. No. 11/542,999, filed Oct. 4, 2006, now U.S. Pat. No. 8,035,628 the contents of which is incorporated herein by reference in its entirety.

BACKGROUND OF THE INVENTION

1. Field of the Invention

The present invention relates to a portable multimedia playback apparatus; more specifically, relates to a portable multimedia playback apparatus for selecting one of a TV compatible signal and a flat panel compatible signal by a multiplexer.

2. Descriptions of the Related Art

Portable multimedia playback apparatuses have been developed into popular multimedia devices nowadays. On the current markets, these apparatuses are provided for processing not only TV compatible signals, but also flat panel compatible signals.

However, the conventional portable multimedia playback apparatuses would not be capable to simultaneously transmit the TV compatible signal and the flat panel compatible signal. If a user wants to transmit the TV compatible signal and the flat panel compatible signal at the same time, the multimedia playback apparatuses must be provided with two sets of pins. It follows that the costs of the portable multimedia playback apparatuses will be raised. Accordingly, a solution for reducing the pins requirement and the costs of the portable multimedia playback apparatuses needs to be developed in this field.

SUMMARY OF THE INVENTION

The primary objective of this invention is to provide a portable multimedia playback apparatus, which comprises a first video processing unit, a second video processing unit, a third video processing unit, a multiplexer, and a digital-to-analog converter (DAC). In this apparatus, the first video processing unit generates a digital video signal, the second video processing unit processes the digital video signal to generate a TV compatible signal, and the third video processing unit processes the digital video signal to generate a flat panel compatible signal. Furthermore, the multiplexer selects one of the TV compatible signal and the flat panel compatible signal, and then the DAC outputs an analog video signal after converting the selected signal.

Another objective of this invention is to provide a portable multimedia playback apparatus, which comprises a first video processing unit, a second video processing unit, and a DAC. In this apparatus, the first video processing unit generates a digital video signal, and the second video processing unit processes the digital video signal to generate one of a TV compatible signal and a flat panel compatible signal. Then, the DAC can output an analog video signal after converting the generated signal.

Still another objective of this invention is to provide a portable multimedia playback apparatus, which comprises a first video processing unit, a second video processing unit, a multiplexer, and a DAC. In this apparatus, the first video processing unit generates a digital video signal and a flat panel compatible signal. In addition, the second video processing unit processes the digital video signal to generate a TV compatible signal. Soon after, the multiplexer operates to select one of the TV compatible signal and the flat panel compatible signal, and then the DAC can output an analog video signal after converting the selected signal.

Yet a further objective of this invention is to provide a portable multimedia playback apparatus, which comprises a first video processing unit, a second video processing unit, a multiplexer, and a DAC. In this apparatus, the first video processing unit is utilized to generate one of a digital video signal and a flat panel compatible signal, and the second video processing unit subsequently processes the generated signal to generate a TV compatible signal when the generated signal is the digital video signal. Soon after, the multiplexer selects one of the TV compatible signal and the flat panel compatible signal, and then the DAC can output an analog video signal after converting the selected signal.

The present invention involves a multiplexer for selecting a signal from the TV compatible signal and the flat panel compatible signal, and subsequently outputs the selected signal. Therefore, the TV compatible signal can share with the flat panel compatible signal at the same pin, to effectively reduce the cost of the portable multimedia playback apparatus.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
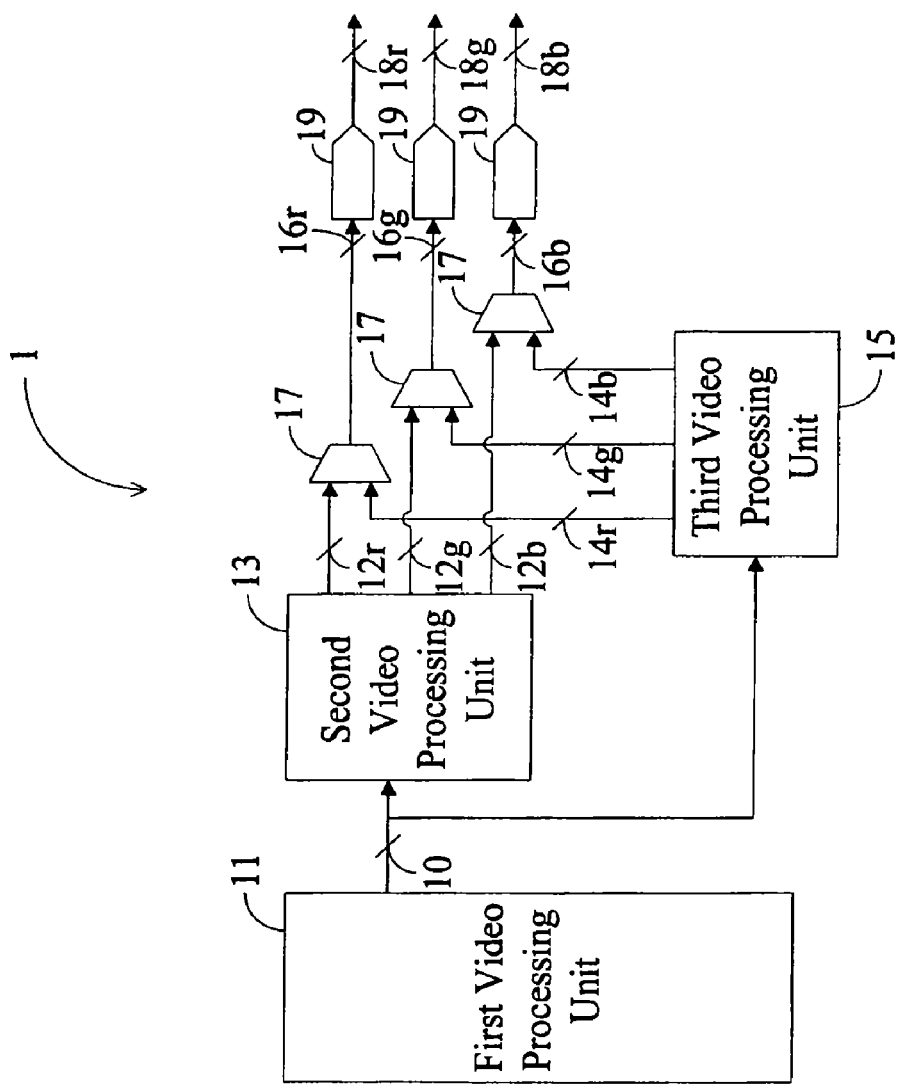
FIG. 1 is a block diagram illustrating a first embodiment of the present invention.

As shown in FIG. 1, the first embodiment of the present invention discloses a portable multimedia playback apparatus 1. The portable multimedia playback apparatus 1 comprises a first video processing unit 11, a second video processing unit 13, a third video processing unit 15, a plurality of multiplexer 17, and a plurality of DACs 19. Substantially, the first video processing unit 11 is a pixel processing unit, the second video processing unit 13 is a TV encoder, and the third video processing unit 15 is a flat panel processing unit.

In specific, the first video processing unit 11 is utilized to generate a digital video signal 10. The second video processing unit 13 can subsequently process the digital video signal 10 to generate a TV compatible signal. The TV compatible signal is composed of an R signal 12r, a G signal 12g, and a B signal 12b, or composed of a Pr or signal 12r, a Y signal 12g, and a Pb signal 12b. Simultaneously, the third video processing unit 15 can process the digital video signal 10 to generate a flat panel compatible signal, which composed of an R signal 14r, a G signal 14g, and a B signal 14b. After that, the multiplexers 17 are utilized to select one of the TV compatible signal and the flat panel compatible signal, and output selected signals 16r, 16g, 16b. Finally, the DACs 19 can output analog video signals 18r, 18g, 18b after receiving and converting the selected signals 16r, 16g, 16b.

Figure 2:
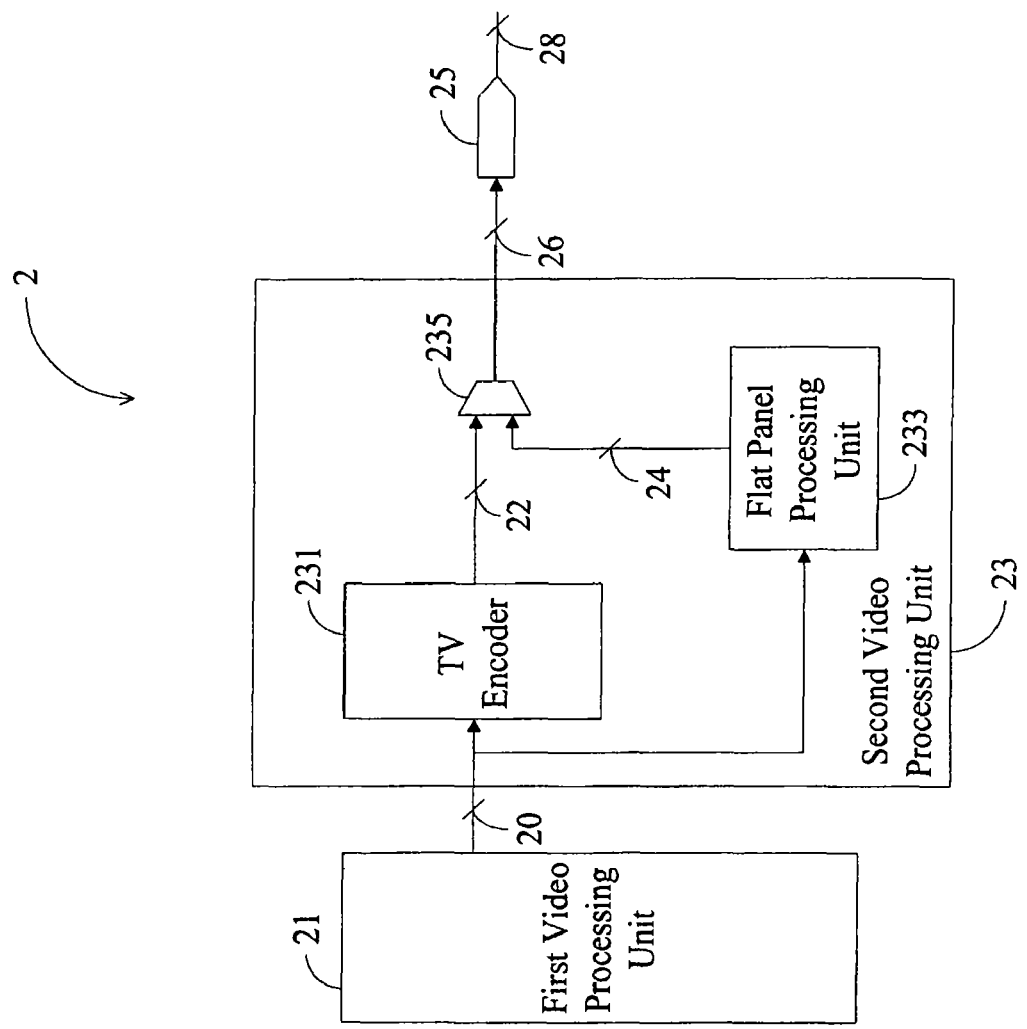
FIG. 2 is a block diagram illustrating a second embodiment of the present invention.

The second embodiment of the present invention as shown in FIG. 2 provides a portable multimedia playback apparatus 2, which comprises a first video processing unit 21, a second video processing unit 23, and a DAC 25. In this embodiment, the first video processing unit 21 substantially is a pixel processing unit. Additionally, the second video processing unit 23 comprises a TV encoder 231, a flat panel processing unit 233, and a multiplexer 235.

The first video processing unit 21 is utilized to generate a digital video signal 20, and the TV encoder 231 receives and processes the digital video signal 20 to generate a TV compatible signal 22. The flat panel processing unit 233 can also process the digital video signal 20 to generate a flat panel compatible signal 24. The multiplexer 235 selects one of the TV compatible signal 22 and the flat panel compatible signal 24, and subsequently outputs a selected signal 26. Finally, the DAC 25 can output an analog video signal 28 after receiving and converting the selected signal 26.

Figure 3:
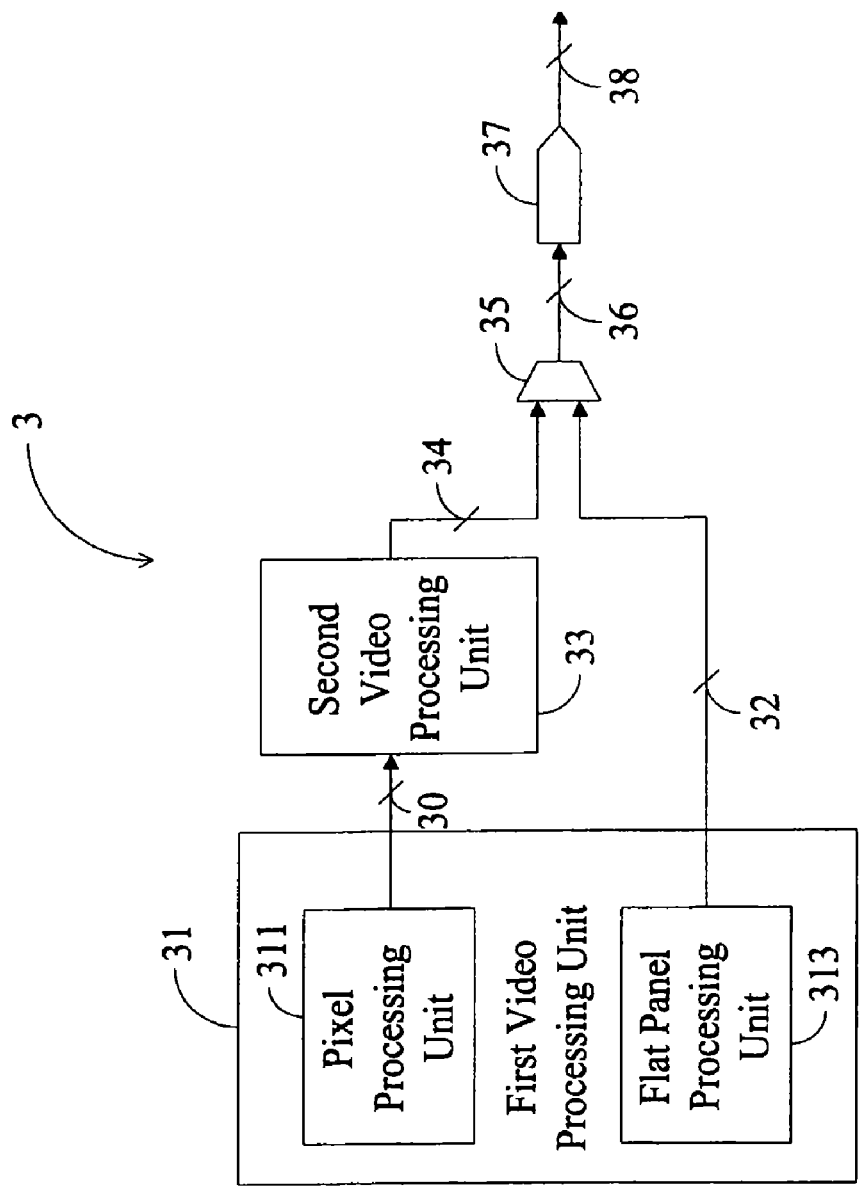
FIG. 3 is a block diagram illustrating a third embodiment of the present invention.

The third embodiment of the present invention as shown in FIG. 3 discloses a portable multimedia playback apparatus 3, which comprises a first video processing unit 31, a second video processing unit 33, a multiplexer 35, and a DAC 37. In this embodiment, the first video processing unit 31 comprises a pixel processing unit 311 and a flat panel processing unit 313. It is noted that the second video processing unit 33 can be a TV encoder.

The pixel processing unit 311 is utilized to generate a digital video signal 30, and the flat panel processing unit 313 can generate a flat panel compatible signal 32. First of all, the first video processing unit 31 outputs the digital video signal 30 and the flat panel compatible signal 32. The second video processing unit 33 then receives and processes the digital video signal 30 to generate a TV compatible signal 34. Soon after, the multiplexer 35 selects one of the TV compatible signal 34 and the flat panel compatible signal 32 after receiving the signals, and subsequently outputs a selected signal 36. Finally, the DAC 37 outputs an analog video signals 38 after converting the selected signal 36.

Figure 4:
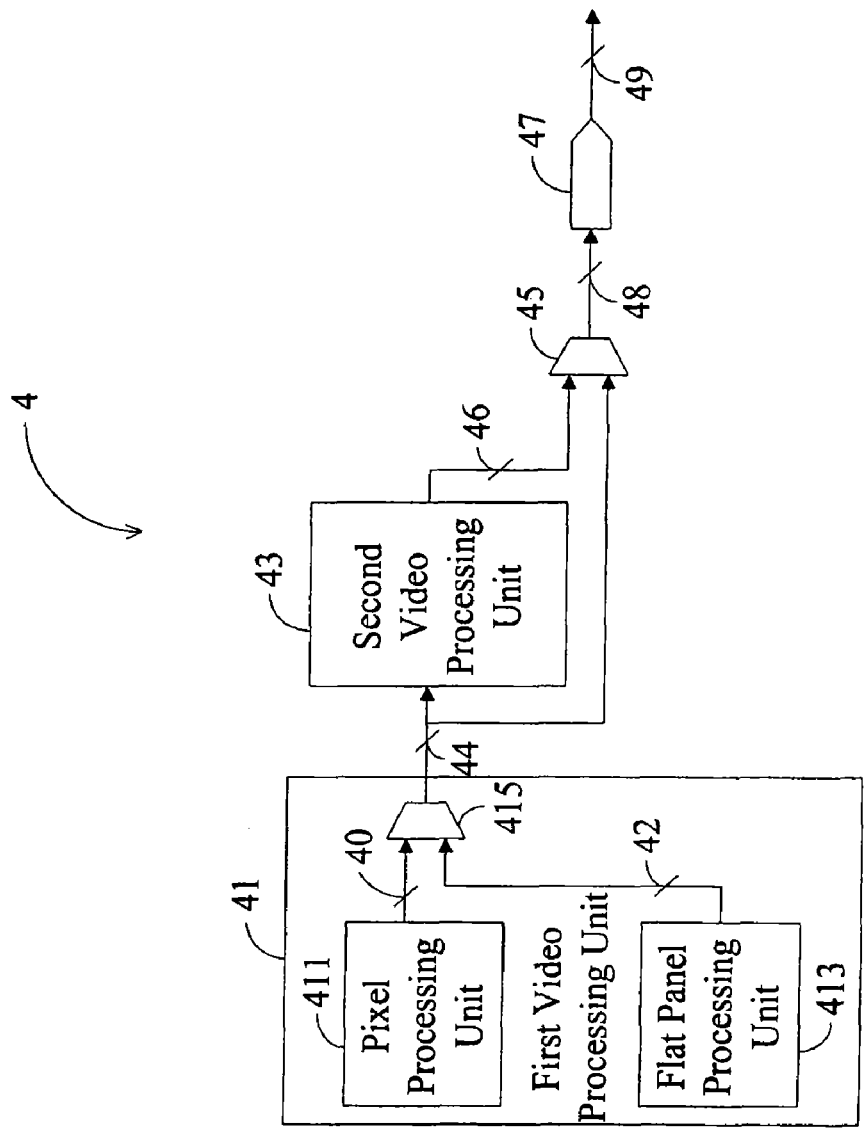
FIG. 4 is a block diagram illustrating a fourth embodiment of the present invention.

The fourth embodiment of the present invention as shown in FIG. 4 discloses a portable multimedia playback apparatus 4. The portable multimedia playback apparatus 4 comprises a first video processing unit 41, a second video processing unit 43, a first multiplexer 45, and a DAC 47. In this embodiment, the first video processing unit 41 has a pixel processing unit 411, a flat panel processing unit 413, and a second multiplexer 415. It is noted that the second video processing unit 43 can be a TV encoder. Preferably, the portable multimedia playback apparatus 4 can be, but not limited to be, a PDA, a DVD player, or any other multimedia product that is capable to operate with audio/video signals.

Specifically, the pixel processing unit 411 can generate a digital video signal 40, and the flat panel processing unit 413 can generate a flat panel compatible signal 42. Subsequently, the second multiplexer 415 works to select one of the digital video signal 40 and the flat panel compatible signal 42, and outputs the first selected signal 44. Soon after, the second video processing unit 43 receives and processes the first selected signal 44 to generate a TV compatible signal 46 when the first selected signal 44 is the digital video signal 40. Also, the first multiplexer 45 works to select one of the TV compatible signal 46 and the first selected signal 44, and outputs a second selected signal 48. Finally, the DAC 47 outputs an analog video signals 49 after receives and converting the second selected signal 48.

In the above-mentioned embodiments, it is noted that the TV compatible signal 22, 34, 46 can be a YPbPr signal or an RGB signal when the flat panel compatible signal 24, 32, 42 is an RGB signal.

Accordingly, the present invention involves the multiplexer to select the TV compatible signal and the flat panel compatible signal, and then outputs the selected signal. Therefore, the TV compatible signal can share the same pin with the flat panel compatible signal. Thus, the cost of the portable multimedia playback apparatus can be reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A portable multimedia playback apparatus, comprising:
   a first video processing unit comprising:
      a pixel processing unit capable of generating a digital video signal and;
      a flat panel processing unit capable of generating a flat panel compatible signal;
   a second video processing unit comprising a TV encoder capable of receiving and processing the digital video signal to convert to a TV compatible signal; and
   a DAC capable of outputting an analog video signal corresponding to one of the TV compatible signal and the flat panel compatible signal at a common output pin after converting the one of the TV compatible signal and the flat panel compatible signal into a corresponding analog form.

2. The portable multimedia playback apparatus as claimed in claim 1, wherein the TV compatible signal is a YPbPr signal.

3. The portable multimedia playback apparatus as claimed in claim 1, wherein the TV compatible signal is an RGB signal.

4. The portable multimedia playback apparatus as claimed in claim 1, wherein the flat panel compatible signal is an RGB signal.

5. The portable multimedia playback apparatus as claimed in claim 1, wherein the portable multimedia playback apparatus is a PDA.

6. The portable multimedia playback apparatus as claimed in claim 1, wherein the portable multimedia playback apparatus is a DVD player.

7. The portable multimedia playback apparatus as claimed in claim 1, further comprising a multiplexer capable of selecting one of the TV compatible signal and the flat panel compatible signal, wherein the DAC is capable of outputting the analog video signal after converting the selected signal.

* * * * *